(12) United States Patent
Cremerius et al.

(10) Patent No.: US 12,134,130 B2
(45) Date of Patent: Nov. 5, 2024

(54) BLANK FOR A CONDUIT ARRANGEMENT

(71) Applicant: GKN Driveline International GmbH, Lohmar (DE)

(72) Inventors: Rolf Cremerius, St. Augustin (DE); Thomas Weckerling, St. Augustin (DE); Ümit Aydin, Wachtberg (DE); Galina Ermakova, Bonn (DE)

(73) Assignee: GKN Driveline International GmbH, Lohmar (DE)

( * ) Notice: Subject to any disclaimer, the term of this patent is extended or adjusted under 35 U.S.C. 154(b) by 953 days.

(21) Appl. No.: 17/056,778

(22) PCT Filed: May 24, 2018

(86) PCT No.: PCT/EP2018/063602
§ 371 (c)(1),
(2) Date: Nov. 19, 2020

(87) PCT Pub. No.: WO2019/223866
PCT Pub. Date: Nov. 28, 2019

(65) Prior Publication Data
US 2021/0178482 A1 Jun. 17, 2021

(51) Int. Cl.
*H01F 27/28* (2006.01)
*B22F 10/20* (2021.01)
(Continued)

(52) U.S. Cl.
CPC ............. *B22F 10/47* (2021.01); *B22F 10/20* (2021.01); *B33Y 10/00* (2014.12); *B33Y 40/20* (2020.01);
(Continued)

(58) Field of Classification Search
CPC ...... H01F 27/2876; H01F 27/12; H01F 27/08; H01F 27/10; H01F 27/105; H01F 27/125;
(Continued)

(56) References Cited

U.S. PATENT DOCUMENTS 2,782,386 A * 2/1957 Cornell ................ H01F 30/06
336/62
5,135,596 A   8/1992 Pabsch et al.
(Continued)

FOREIGN PATENT DOCUMENTS

CN    105599178 A    5/2016
CN    107155311 A    9/2017
(Continued)

OTHER PUBLICATIONS

Chinese Office Action mailed Apr. 28, 2022 in related application CN201880095873.1 (18 pages; with English machine translation).
(Continued)

*Primary Examiner* — Tszfung J Chan
(74) *Attorney, Agent, or Firm* — Bejin Bieneman PLC

(57) ABSTRACT

A blank for a conduit arrangement includes an annular conduit having a first end and a second end, which is formed by a channel surrounded by a wall. The conduit arrangement has an axis of rotation and the conduit extends in a circumferential direction over an angle of more than 360 degrees about the axis of rotation and forms at least one wind turn. The axis of rotation is arranged perpendicularly to a base surface, the wall having first surfaces which are arranged at a first angle of at least 30 degrees relative to the base surface or in which a surface normal forms at least one second angle of 0 to 60 degrees with respect to the base surface. First partial surfaces of the walls, which face one another in an axial direction, of adjacent turns are arranged spaced apart from one another. The blank is produced by an additive manufacturing process.

9 Claims, 7 Drawing Sheets

(51) Int. Cl.
*B22F 10/47* (2021.01)
*B33Y 10/00* (2015.01)
*B33Y 40/20* (2020.01)
*B33Y 80/00* (2015.01)
*H01F 41/04* (2006.01)

(52) U.S. Cl.
CPC .......... *B33Y 80/00* (2014.12); *H01F 27/2876* (2013.01); *H01F 41/04* (2013.01)

(58) Field of Classification Search
CPC .......... H01F 27/16; B22F 10/47; B22F 10/20; B33Y 10/00; B33Y 80/00; B33Y 40/20
USPC ................................................ 336/55, 57–62
See application file for complete search history.

(56) References Cited

U.S. PATENT DOCUMENTS

2016/0262218 A1* 9/2016 Tanaka .................. H05B 6/367
2017/0125165 A1   5/2017 Prest

FOREIGN PATENT DOCUMENTS

| | | | | |
|---|---|---|---|---|
| CN | 107530775 A | * | 1/2018 | ............. B22F 10/00 |
| EP | 3223286 A1 | | 9/2017 | |
| GB | 1204584 A | * | 1/1968 | ............. H05B 6/02 |
| JP | H04293726 A | | 10/1992 | |
| JP | 2014216129 A | | 11/2014 | |
| JP | 2015-053110 A | | 3/2015 | |
| KR | 2016089114 A | * | 7/2016 | ............. H05B 6/108 |
| KR | 20160089114 A | | 7/2016 | |
| WO | 2015200257 A1 | | 12/2015 | |
| WO | 2017179587 A1 | | 10/2017 | |

OTHER PUBLICATIONS

Japanese Office Action mailed Feb. 22, 2022 for related application JP2020-565768 (12 pages; with English machine translation).
Chinese Patent Office Notification of Second Office Action mailed Nov. 25, 2022 for related Application No. CN201880095873.1 (16 pages; with English machine translation).
International Search Report and Written Opinion for PCT/EP2018/063602 mailed Feb. 25, 2019 (13 pages; with English translation).

* cited by examiner

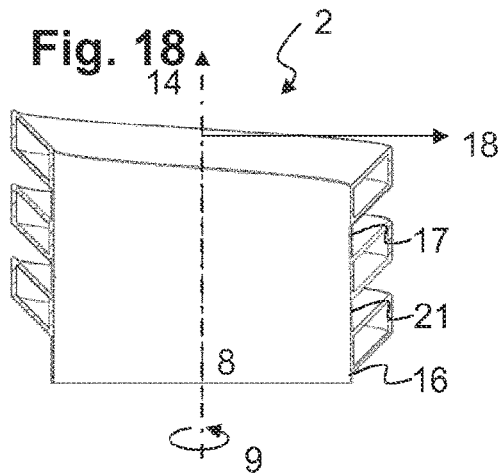
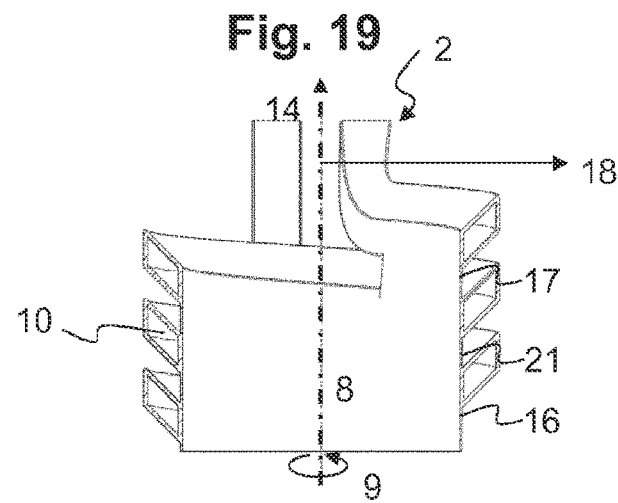
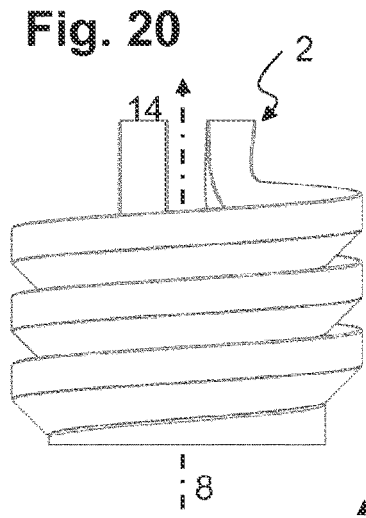
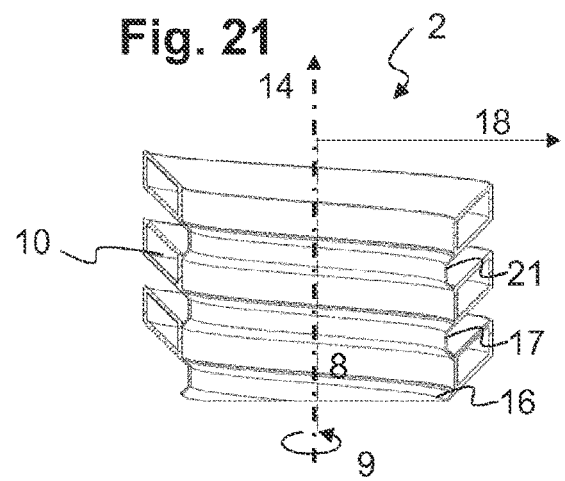
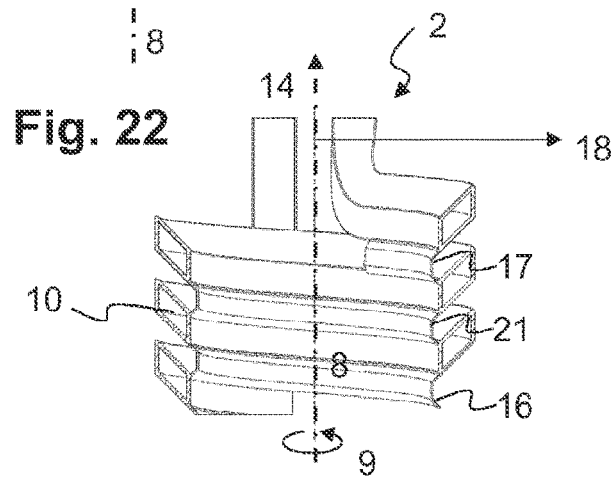
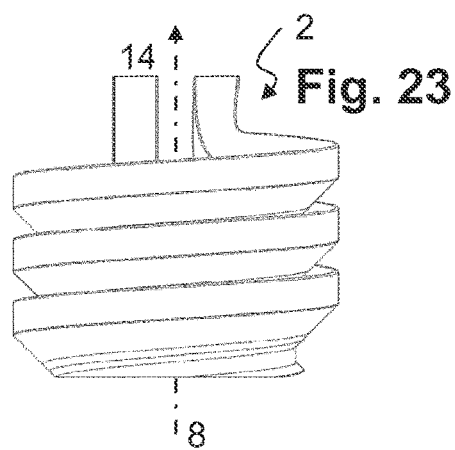

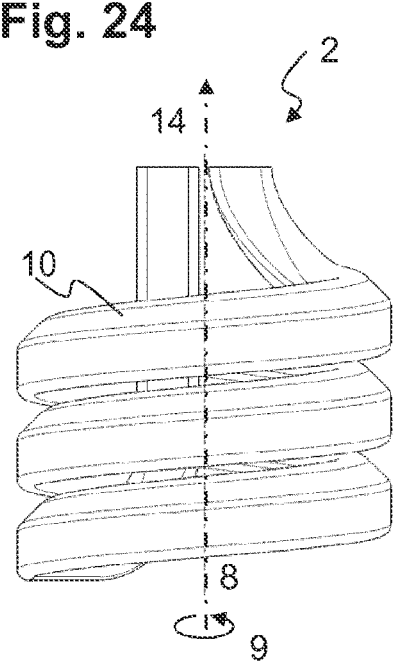
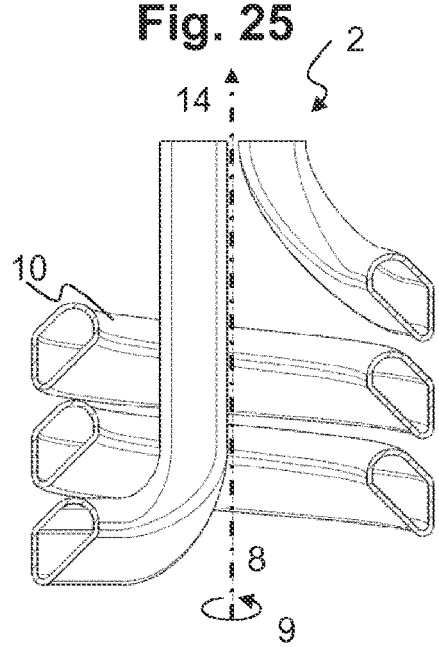
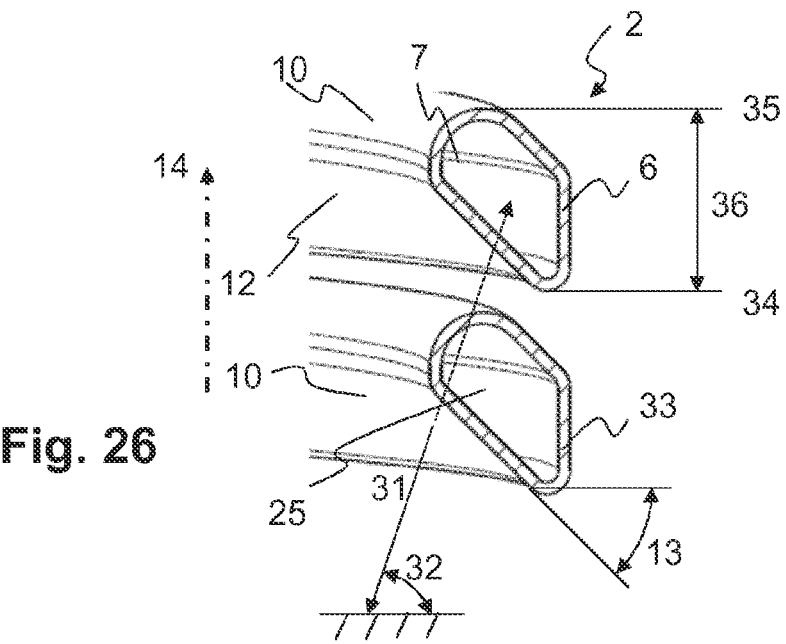

BLANK FOR A CONDUIT ARRANGEMENT

CROSS-REFERENCE TO RELATED APPLICATIONS

This application is a national stage of, and claims priority to, Patent Cooperation Treaty Application No. PCT/EP2018/063602, filed on May 24, 2018, which application is hereby incorporated herein by reference in its entirety.

BACKGROUND

Generative manufacturing processes for producing workpieces are generally known. The term "generative manufacturing process" (also referred to as "additive manufacturing" (AM)) is a comprehensive term for all processes for the fast and cost-effective manufacture of models, samples, prototypes, tools and end products. This manufacture takes place directly on the basis of the data models inside the computer that are composed of formless (liquids, gels/pastes, powder, and the like) or form-neutral (strip-shaped, wire-shaped, sheet-shaped) material by means of chemical and/or physical processes. Although it is often a question of forming processes, no special tools that have stored the respective geometry of the workpiece (for example casting molds) are required for a specific product. The different processes are e.g. powder bed processes, free-space processes, liquid-material processes, and other layer build-up processes, some of which are similar to 3D printing. A distinction can also be made between the processes by the material for building up the product, e.g. plastic, metal and ceramics.

SUMMARY

Disclosed herein is a blank of a line arrangement, in particular of an electrical inductor. The blank is produced in particular by a generative (or additive) manufacturing process.

The inductor has in particular an annular line which has a first end and a second end and is formed by a channel enclosed by a wall. A coolant can flow through the channel during operation of the inductor. The inductor and/or the wall thereof is an electrical conductor and/or comprises at least one electrical conductor which is used in particular for the thermal treatment of components.

The inductor is provided in particular for the production of joints, e.g. constant-velocity ball joints. In this case, the inductor is inserted in particular into joint outer parts of constant-velocity joints such that at least the surfaces of the constant-velocity joint (e.g. guide surfaces for balls or for a cage) can be treated by the inductor.

Producing a blank of an inductor described above that has a plurality of turns which are arranged adjacent to one another in an axial direction is at least difficult to achieve by means of a regenerative manufacturing process.

Proceeding from this, it is an object of the present disclosure to at least partially solve the problems discussed in conjunction with the prior art. In particular, it is intended to propose a blank of a line arrangement that can be produced by a regenerative manufacturing process. Here, in particular, a loss of material (i.e. the blank of the line arrangement to form the line arrangement) that occurs during production should be kept as low as possible.

A blank according to the disclosure is conducive for this purpose. The features individually specified in the disclosure can be combined with one another in a technologically meaningful way and can be supplemented by explanatory substantive matter from the description and details from the figures.

A blank of a line arrangement is proposed, at least comprising an annular line which has a first end and a second end and is formed by a channel enclosed by a wall. The line arrangement has an axis of rotation. The line extends in a circumferential direction over more than 360 angular degrees around the axis of rotation and forms at least two turns, which are arranged adjacent to one another in an axial direction (axial direction parallel to the axis of rotation). The axis of rotation is arranged perpendicular to a base area. The channel has a throughflow cross section and the turn forming the channel has a cross section that encompasses the throughflow cross section. The cross section has a height between a lower boundary (starting from the base area, the lower boundary forms the bottom side of the turn) and an upper boundary (starting from the base area, the top side of the turn) in the axial direction. Starting from the lower boundary and at least up to 30% of the height, in particular up to 50% of the height, preferably up to 75% of the height; particularly preferably over the entire height, the wall has exclusively first areas (which do not make contact with the base area),
- which are arranged and/or run at a first angle of at least 30 angular degrees, in particular at least 45 angular degrees, with respect to the base area (i.e. first angles between 30 and 150 angular degrees and/or between 45 and 135 angular degrees), or
- in which a surface normal forms at least a (smallest) second angle of from 0 to 60 angular degrees, in particular of from 0 to 45 angular degrees, with respect to the base area.

First sub-areas, which face one another in the axial direction, of the walls of adjacently arranged turns are arranged spaced apart from one another. The blank is (exclusively) produced by a generative manufacturing process (starting from the base area and in the axial direction).

In particular, a gap between adjacently arranged turns in the axial direction is less than 10 millimeters, preferably less than 5 millimeters (but greater than 0 millimeters).

The line arrangement comprises in particular an annular line which has turns arranged adjacent to one another in the axial direction. The individual turns arranged adjacently in the axial direction are in particular arranged at positions in the radial direction that overlap one another.

The line extends between a first end and a second end. The wall of the line on the inside forms at least one channel, through which e.g. a fluid can flow. The fluid can therefore e.g. enter the channel via an open first end, be directed along the channel in the line to an open second end and exit via the second end.

In particular, the channel has a throughflow cross section through which the fluid can flow. In particular, the throughflow cross section is substantially constant along the line (or has a variance of at most 30%).

Starting from a base area, the blank can be produced or built up by a generative manufacturing process. The blank is thus formed (e.g. by successive (melting and subsequent) solidification of a previously formless or form-neutral material) starting from the base area and in the axial direction, in particular layer by layer (each layer substantially parallel to the base area and in particular at most one millimeter thick).

In the case of the blank, in particular the following problems that occur in AM processes are taken into consideration:

relatively large throughflow cross sections cannot be produced in the AM process, because, in the layer build-up process, relatively large overhangs cannot be formed;

the bottom part of each turn must be supported during manufacture; i.e. if an adjacent turn is located under a turn, the supporting structure must be built up in the gap between the turns;

supporting structures within the channels cannot be removed (or can be removed only with great outlay), supporting structures between the turns can be removed only with great difficulty.

During production of the blank, in particular (first and/or second) areas (i.e. in particular surfaces, also curved surfaces) are formed which run in a manner inclined at least by 30 angular degrees with respect to the base area or the surface normal of which forms at least a (smallest) second angle of from 0 to 60 angular degrees with respect to the base area.

Here, in particular, each further layer which is connected or added successively to the blank in the axial direction must be built up on a layer that already forms the blank, wherein the areas (surfaces) of the layers have a first angle of at least 30 degrees with respect to the base area in the axial direction or the surface normal thereof forms at least a second angle of from 0 to 60 angular degrees with respect to the base area.

Edges and/or lines or radii, in particular radii with a radius of less than 8 millimeters, in particular of less than 5 millimeters, preferably of less than 2 millimeters, in this case can also run at a smaller first angle with respect to the base area or have a larger second angle between the surface normal and the base area. An area of the blank that makes contact with the (solid) base area and/or a bottom layer can in particular likewise run at a smaller first angle.

(First and/or second) areas, which are arranged at a first angle of at least 30 angular degrees with respect to the base area in the axial direction, can be produced by the generative manufacturing process. Areas that have a smaller first angle cannot be produced in particular without complex supporting structures (unless the diameter of the throughflow cross section is less than approximately 8 millimeters) and/or can only be produced with relatively great outlay in terms of technology or time.

In particular, the channel has a throughflow cross section and the turn forming the channel has a cross section that encompasses the throughflow cross section. The cross section has a height between a lower boundary (the lowest point of the cross section in the axial direction) and an upper boundary (the highest point of the cross section in the axial direction) in the axial direction. Starting from the lower boundary and at least up to 30% of the height, the wall has exclusively first areas (which do not make contact with the base area). In particular, in the rest of the region of the cross section (i.e. in particular from 30% of the height to 100% of the height), the wall of the turn can be formed by areas (i.e. in particular surfaces, also curved surfaces) which run in a manner inclined by less than 30 angular degrees with respect to the base area or the surface normal thereof forms at least a (smallest) second angle of more than 60 angular degrees with respect to the base area.

In particular, the blank has a supporting structure which is used to produce the blank. The supporting structure is likewise (exclusively) produced by a generative manufacturing process. The supporting structure is in particular materially bonded to the blank and/or the line arrangement. In particular, the supporting structure is produced jointly (i.e. at least partially at the same time) with the blank and/or the line arrangement. In particular, the supporting structure has (exclusively) the function of supporting the blank and/or the line arrangement during production and thus making it possible to produce it. After the blank has been produced, the supporting structure can be separated completely from the line arrangement without the intended function of the line arrangement being adversely affected as a result.

Furthermore, the support structure can dissipate heat and thus at least reduce distortion of the blank.

The blank preferably additionally has a supporting structure, which is formed by second areas at least to an extent of 30% by weight (in relation to the entire supporting structure; not the line arrangement or the entire blank), in particular at least to an extent of 50% by weight, preferably at least to an extent of 75% by weight, particularly preferably to an extent of 100% by weight, wherein the second areas are arranged at a first angle of at least 30 angular degrees with respect to the base area or the surface normal thereof forms at least a (smallest) second angle of from 0 to 60 angular degrees with respect to the base area.

In particular, starting from the wall, the supporting structure extends in a radial direction exclusively inside or outside the at least one turn. In particular, a smaller part of the supporting structure (e.g. at most 30% by weight of the supporting structure) can be arranged in the region of the turn in the radial direction (i.e. in the axial direction, in line with the turn).

Edges and/or lines or radii, in particular radii with a radius of less than 8 millimeters, in particular of less than 5 millimeters, preferably of less than 2 millimeters, in this case can also run at a smaller first angle with respect to the base area or have a larger second angle between the surface normal and the base area. An area of the supporting structure that makes contact with the (solid) base area and/or a bottom layer can in particular likewise run at a smaller first angle.

The blank preferably comprises the annular line and the supporting structure, and the supporting structure has a proportion of at most 30% by weight, in particular at most 20% by weight, preferably at most 10% by weight, particularly preferably at most 5% by weight, with respect to the material forming the blank. In particular, the annular line, which in particular comprises exclusively the wall forming the channel, has a proportion of at least 70% by weight.

By virtue of the blank proposed here, the proportion of the material that is required to support the structure during production of the blank can be kept low. Costs, energy but also material can thus be saved. In particular, the complexity of reworking the blank to produce the line arrangement is reduced.

In particular, the supporting structure comprises (at least) one web that extends inwardly or outwardly from the wall of the at least one turn at least in a radial direction and encircles the wall in the circumferential direction, wherein webs of individual turns are attached to a supporting wall which is arranged inside or outside the at least one turn and extends from the base area in the axial direction.

In particular, the supporting structure is formed exclusively by the supporting wall and the webs.

The supporting structure preferably comprises a connecting wall which encircles the wall in the circumferential direction and connects the walls of turns which are arranged adjacent to one another to one another.

In particular, the connecting walls extend exclusively in the axial direction and in the circumferential direction. Starting from the wall of a turn, the connecting wall preferably extends in the radial direction and in the axial direction.

In particular, in the axial direction, the blank has a first end face and an oppositely arranged second end face. The first end and the second end are arranged on the second end face. Starting from the first end, the channel extends at least partially in the axial direction as far as the first end face and forms a first turn there. In particular, starting from the first turn, the channel extends over at least one further last turn, which is arranged on the second end face, as far as a second end.

In particular, the channel has a throughflow cross section with a largest width, wherein the largest width amounts to at least 8 millimeters, preferably at least 10 millimeters.

In particular, widths of at least 8 millimeters (i.e. without further support within the channel) can be realized by the proposed design of a blank.

A line arrangement produced from the blank already described is also proposed. First sub-areas, which face one another in an axial direction, of adjacently arranged turns are arranged spaced apart from one another and individual turns are connected exclusively via the wall. The adjacently arranged turns are therefore not carried or supported by further supporting elements.

The use of the line arrangement described is proposed, wherein the line arrangement is used as an electrical inductor through which a coolant can flow through the channel.

The material of the line arrangement comprises or consists of electrically conductive material, such as e.g. copper, electrical-grade copper or further copper alloys, alloys of at least copper and zirconium, aluminum, etc.

The material is preferably in the form of a powder prior to production of the blank, the powder first being bonded to form the blank in the course of the generative manufacturing process.

In particular, the two turns respectively have cross sections which are arranged adjacent to one another in the axial direction, wherein the two cross sections are different from one another. Each turn has, in particular, a channel with a throughflow cross section, wherein the cross section encompasses the throughflow cross section.

A method for producing the line arrangement described is also proposed. The method comprises at least the following steps:

a) creating the blank having a supporting structure by way of a generative manufacturing process, wherein the supporting structure is formed by second areas at least to an extent of 30% by weight (in relation to the entire supporting structure; not the line arrangement or the entire blank), in particular at least to an extent of 50% by weight, preferably at least to an extent of 75% by weight, particularly preferably to an extent of 100% by weight, wherein the second areas are arranged at a first angle of at least 30 angular degrees with respect to the base area or have surface normals which form at least one (smallest) second angle of from 0 to 60 angular degrees with respect to the base area; wherein, starting from the wall, the supporting structure extends in the radial direction exclusively inside or outside the at least one turn;

b) removing the supporting structure by machining.

In particular, the blank comprises the annular line and/or the line arrangement and the supporting structure, wherein the supporting structure has a proportion of at most 30% by weight with respect to the material forming the blank.

In particular, the statements relating to the blank can be transferred to the line arrangement, the use and the method, and vice versa.

As a precaution, it should be noted that the numerals used here ("first", "second", . . . ) primarily (only) serve to distinguish a plurality of identical objects, variables or processes, i.e. in particular do not necessarily predefine any dependence and/or sequence of these objects, variables or processes with respect to one other. Should a dependence and/or sequence be required, it is explicitly stated here or it is obvious for a person skilled in the art when studying the configuration specifically described.

BRIEF DESCRIPTION OF THE DRAWINGS

The disclosure is explained in more detail below with reference to the figures. It should be pointed out that the invention is not intended to be restricted by the examples shown. In particular, unless explicitly stated otherwise, it is also possible to extract partial aspects of the substantive matter explained in the figures and to combine them with other constituent parts and knowledge from the present description and/or figures. The same reference signs denote the same objects and therefore where appropriate explanations from other figures can be used in a supplementary manner. In the figures, in each case schematically:

FIG. 18: shows a part of a sixth example of a blank in a perspective view, partially in section;

FIG. 19: shows another part of the sixth example according to FIG. 19 in a perspective view, partially in section;

FIG. 20: shows the sixth example according to FIGS. 18 and 19 in a side view;

FIG. 21: shows a part of a seventh example of a blank in a perspective view, partially in section;

FIG. 22: shows another part of the seventh example according to FIG. 21 in a perspective view, partially in section;

FIG. 23: shows the seventh example according to FIGS. 21 and 22 in a side view;

FIG. 24: shows an eighth example of a blank and/or of a line arrangement in a perspective view;

FIG. 25: shows a part of the eighth example of a blank in a perspective view, partially in section; and FIG. 26: shows a detail of the blank and/or of the line arrangement according to FIGS. 24 and 25 in a perspective view and partially in section.

DESCRIPTION

Figure 1:
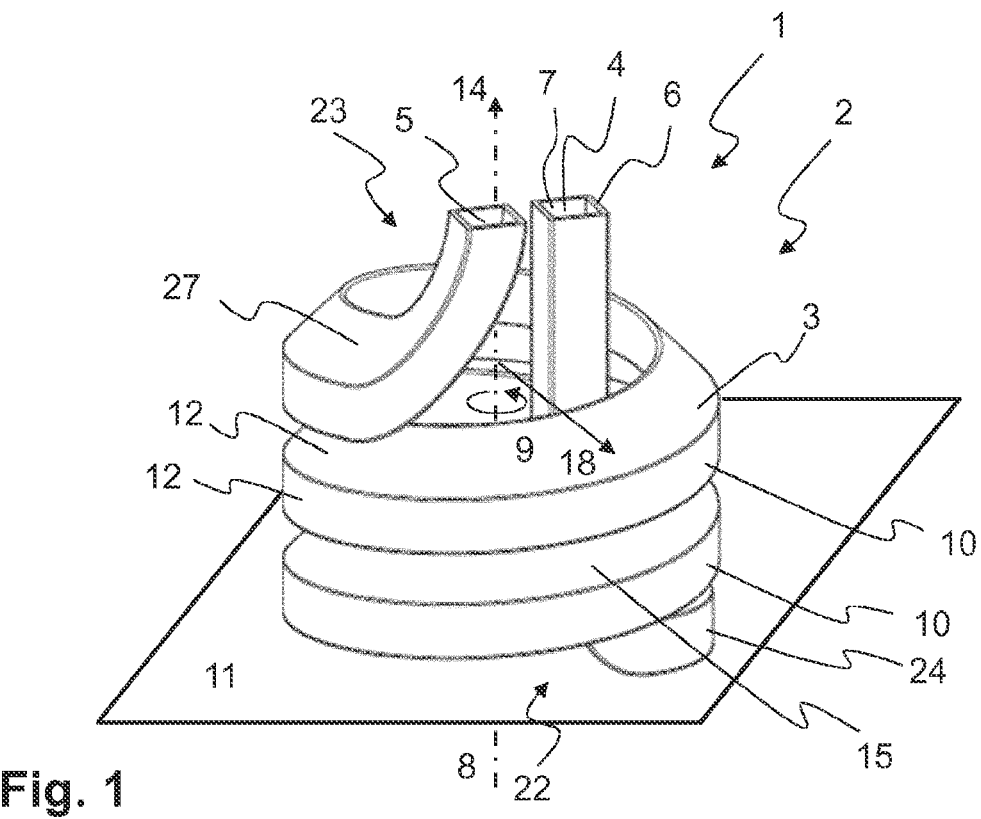
FIG. 1: shows a first example of a blank and/or of a line arrangement in a perspective view.
Figure 2:
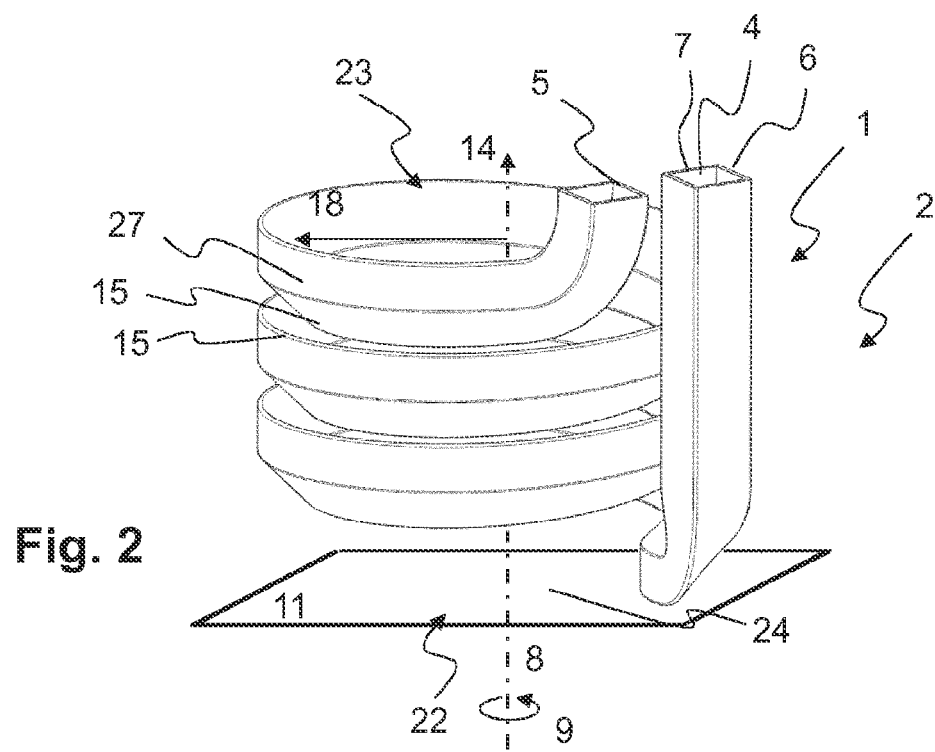
FIG. 2: shows a second example of a blank and/or of a line arrangement in a perspective view.
Figure 3:
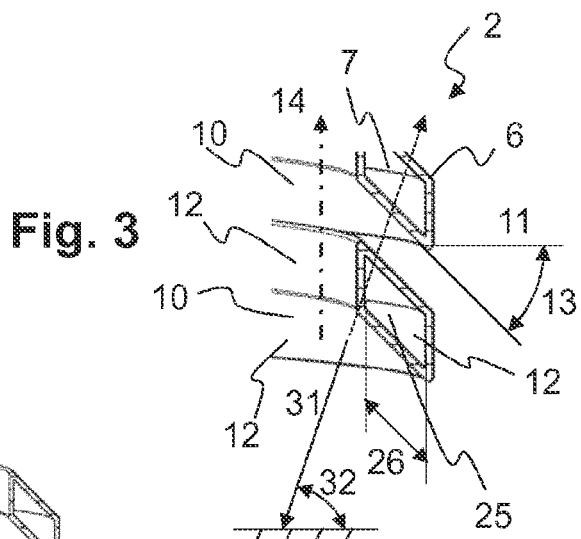
FIG. 3: shows a detail of the blank and/or of the line arrangement according to FIGS. 1 and 2 in a perspective view and partially in section.

FIG. 1 shows a first example of a blank 1 and/or of a line arrangement 2 in a perspective view. FIG. 2 shows a second example of a blank 1 and/or of a line arrangement 2 in a perspective view. FIG. 3 shows a detail of the blank 1 according to FIG. 1 in a perspective view and partially in section. FIGS. 1 to 3 are described jointly below.

The blank 1 and/or the line arrangement 2 comprises an annular line 3 which has a first end 4 and a second end 5 and is formed by a channel 7 enclosed by a wall 6. The line arrangement 2 and/or the blank 1 has an axis of rotation 8. The line 3 extends in a circumferential direction 9 over more than 360 angular degrees (here approx. 990 angular degrees) around the axis of rotation 8 and forms two turns 10, which are arranged adjacent to one another in an axial direction 14 (axial direction 14 parallel to the axis of rotation 8). The axis of rotation 8 is arranged perpendicular to a base area 11. The wall 6 has first areas 12 (which do not make contact with the base area 11) which are arranged and/or run at a first angle 13 of at least 30 angular degrees with respect to the base area 11 (i.e. first angles 13 between 30 and 150 angular degrees and/or between 45 and 135 angular degrees). The wall 6 has first areas 12 (which do not make contact with the base area 11), in which a surface normal 31 forms at least a second angle 32 of from 0 to 60 angular degrees with respect to the base area 11. First sub-areas 15, which face one another in the axial direction 14, of the walls 6 of adjacently arranged turns 10 are arranged spaced apart from one another. The blank 1 is produced exclusively by a generative manufacturing process.

The line arrangement 2 comprises an annular line 3 which has turns 10 arranged adjacent to one another in the axial direction 14. The individual turns 10 arranged adjacently in the axial direction 14 are arranged at positions in the radial direction 18 that overlap one another.

The line 3 extends between a first end 4 and a second end 5. The wall 6 of the line 3 forms a channel 7 through which a fluid can flow. The channel 7 has a throughflow cross section 25 through which the fluid can flow. The throughflow cross section 25 is substantially constant along the line 3.

Starting from the base area 11, the blank 1 is produced by a generative manufacturing process. The blank 1 is thus formed (e.g. by successive solidification (if appropriate, melting or liquefaction in the interim) of a previously formless or form-neutral material) starting from the base area 11 and in the axial direction 14, layer by layer (each layer substantially parallel to the base area 11).

During production of the blank 1, (first and second) areas 12, 17 are formed which run in a manner inclined at least by 30 angular degrees with respect to the base area 11 in the axial direction 14 or in which a surface normal 31 forms at least a second angle 32 of from 0 to 60 angular degrees with respect to the base area 11. An area of the blank 1 that makes contact with the (solid) base area 11 and/or a bottom layer can in particular run at a smaller first angle 13.

The channel 7 has a throughflow cross section 25 with a largest width 26.

The examples shown in FIG. 1 and FIG. 2 differ by way of the different inclinations of the walls 6 of the line 3 and also by way of the arrangement of the first end 4 and second end 5 of the line 3.

Figure 4:
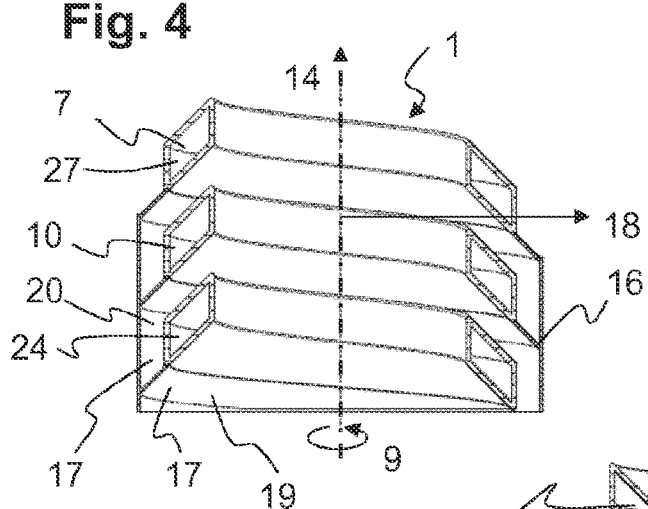
FIG. 4: shows a part of the first example of a blank according to FIG. 1 in a perspective view, partially in section.
Figure 5:
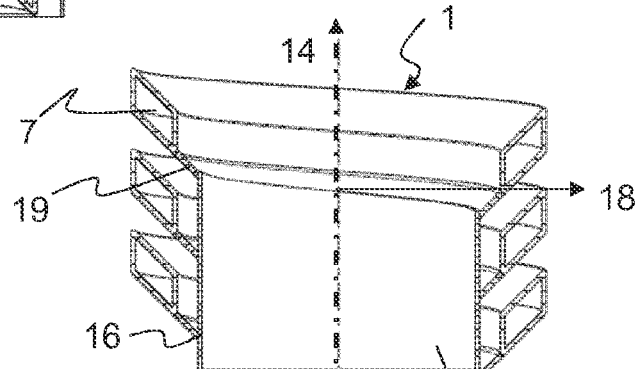
FIG. 5: shows a part of the second example of a blank according to FIG. 1 in a perspective view, partially in section.
Figure 6:
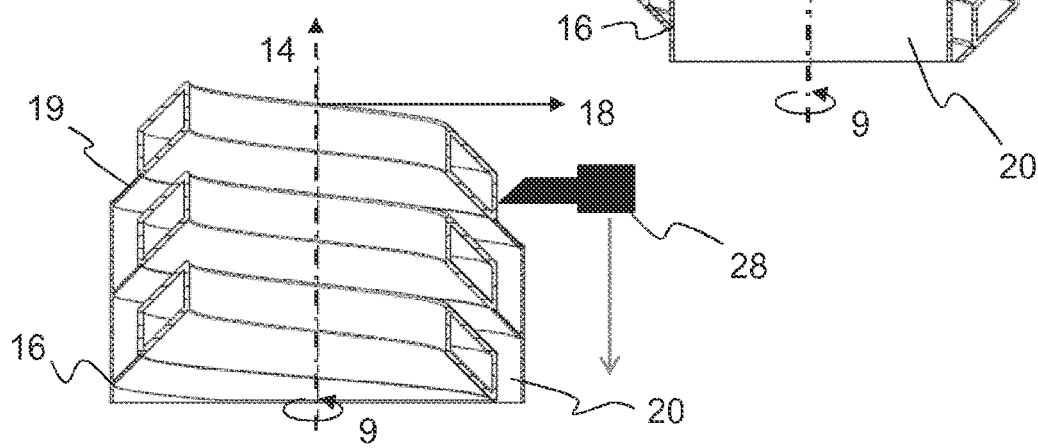
FIG. 6: shows a machining operation of the blank according to FIG. 4 in a perspective view, partially in section.
Figure 7:
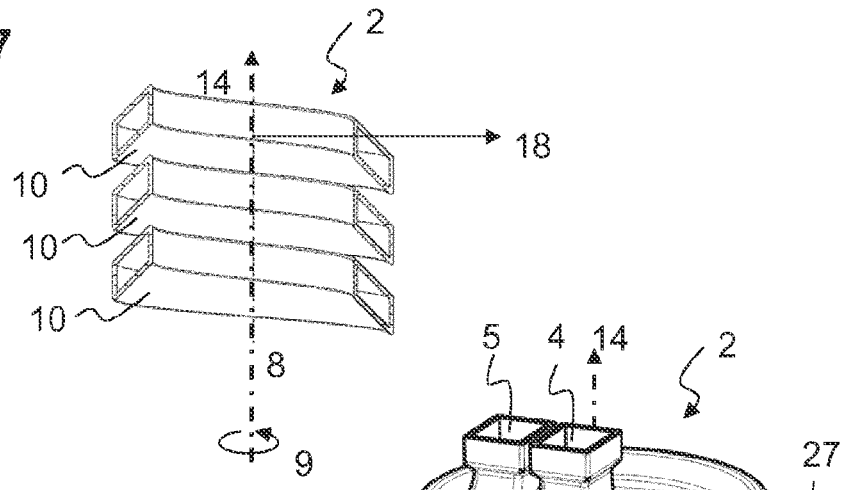
FIG. 7: shows the processed blank (the line arrangement) according to FIG. 6 in a perspective view, partially in section.

FIG. 4 shows a part of the first example of a blank 1 according to FIG. 1 in a perspective view, partially in section. FIG. 5 shows a part of the second example of a blank 1 according to FIG. 1 in a perspective view, partially in section. FIG. 6 shows a machining operation of the blank 1 according to FIG. 4 in a perspective view, partially in section. FIG. 7 shows the processed blank 1 (the line arrangement 2) according to FIG. 6 in a perspective view, partially in section. FIGS. 4 to 6 are described jointly below. Reference is made to the statements relating to FIGS. 1 to 3.

The blank 1 has a supporting structure 16 which is used to produce the blank 1. The supporting structure 16 is likewise (exclusively) produced by a generative manufacturing process. The supporting structure 16 is materially bonded to the blank 1 and/or to the line arrangement 3. The supporting structure 16 is produced jointly (i.e. at least partially parallel at the same time) with the blank 1 and/or the line arrangement 2.

The blank 1 additionally has a supporting structure 16 which is formed exclusively by second areas 17, wherein the second areas 17 are arranged at a first angle 13 of at least 30 angular degrees with respect to the base area 11 in the axial direction 14. The supporting structure 16 has second areas 17 (which do not make contact with the base area 11), in which a surface normal 31 forms at least a second angle 32 of from 0 to 60 angular degrees with respect to the base area 11 (see FIG. 3, illustrated there on first areas 12). Starting from the wall 6, the supporting structure 16 extends in a radial direction 18 inside (FIG. 5) or outside (FIGS. 4 and 6) the turns 10.

The blank 1 comprises the annular line 3 and the supporting structure 16, and the supporting structure 16 has a proportion of at most 30% by weight with respect to the material forming the blank 1. In particular, the annular line 3, which in particular comprises exclusively the wall 6 forming the channel 7, thus has a proportion of at least 70% by weight.

The supporting structure 16 comprises web 19 that extends inwardly or outwardly from the wall 6 of the respective turn 10 at least in a radial direction 18 and encircles the wall 6 in the circumferential direction 9, wherein webs 19 of individual turns 10 are attached to a supporting wall 20 which is arranged inside or outside the at least one turn 10 and extends from the base area 11 in the axial direction 14.

Here, the supporting structure 16 is formed exclusively by the supporting wall 20 and the webs 19.

FIG. 6 illustrates that the webs 19, which extend outwardly (here) from the wall 6 of the respective turn 10 at least in a radial direction 18 and encircle the wall 6 in the circumferential direction 9, can be removed easily by (mechanical) processing by means of the tool 28 (feed direction labelled by the arrow; blank 1 is rotated with respect to the tool 28).

Figure 8:
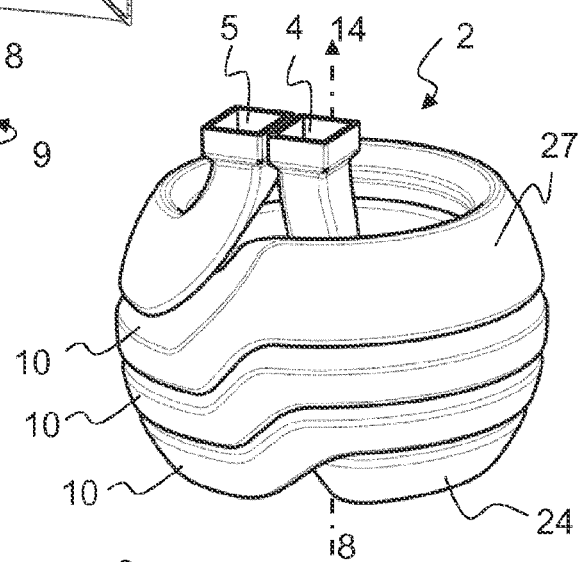
FIG. 8: shows a third example of a line arrangement in a perspective view.
Figure 9:
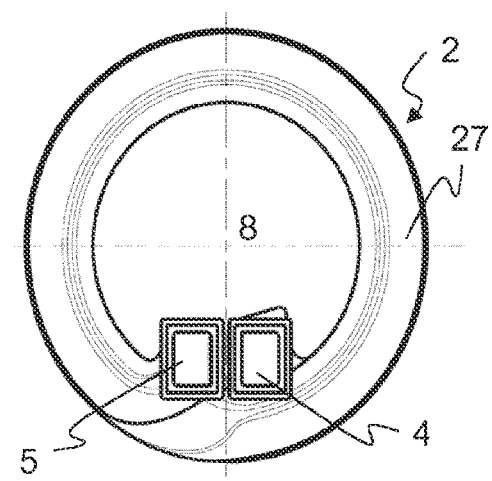
FIG. 9: shows the line arrangement according to FIG. 8 in a view along the axis of rotation.
Figure 10:
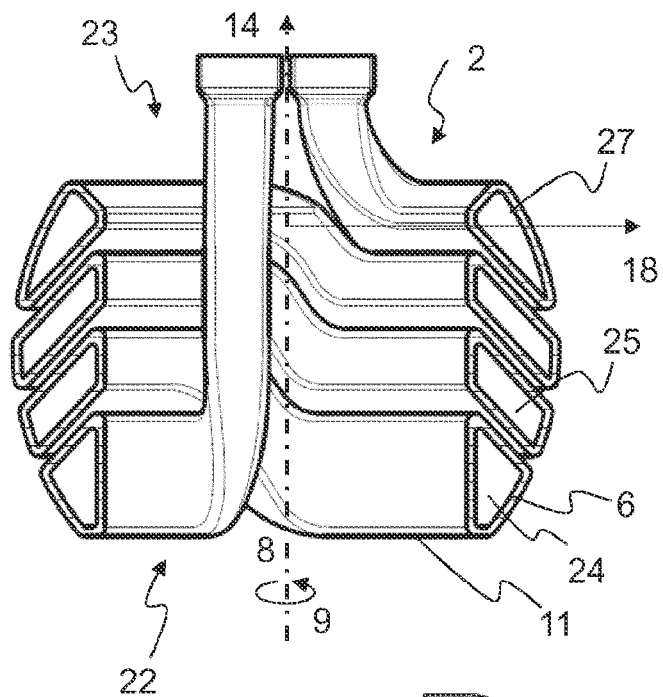
FIG. 10: shows the line arrangement according to FIGS. 8 and 9 in a side view in section.
Figure 11:
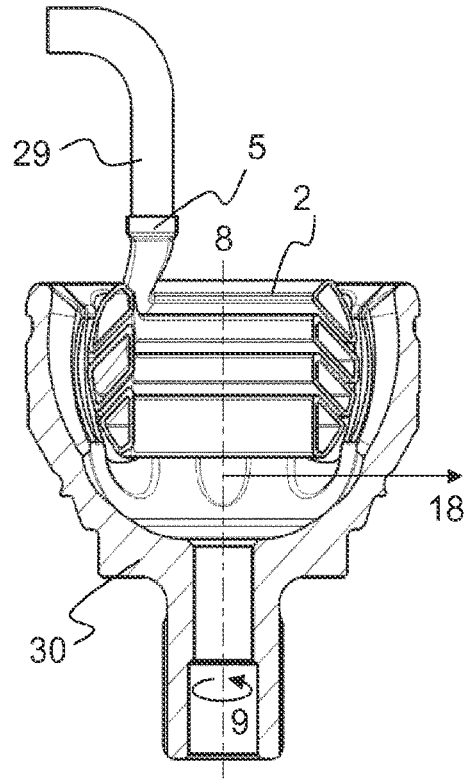
FIG. 11: shows the line arrangement according to FIGS. 8 to 10 during operation as an inductor.

FIG. 8 shows a third example of a line arrangement 2 in a perspective view. FIG. 9 shows the line arrangement 2 according to FIG. 8 in a view along the axis of rotation 8. FIG. 10 shows the line arrangement 2 according to FIGS. 8 and 9 in a side view in section. FIG. 11 shows the line arrangement 2 according to FIGS. 8 to 10 during operation as an inductor. FIGS. 8 to 11 are described jointly below. Reference is made to the statements relating to FIGS. 1 to 3.

In the axial direction 14, the line arrangement 2 has a first end face 22 and an oppositely arranged second end face 23. The first end 4 and the second end 5 are arranged on the second end face 23. Starting from the first end 4, the channel 7 extends at least partially in the axial direction 14 as far as the first end face 22 and forms a first turn 24 there. Starting from the first turn 24, the channel 7 extends over further turns 10 to a last turn 27, which is arranged on the second end face 23, as far as a second end 5.

The line arrangement 2 has walls 6 which are curved on the outside. The curved wall 6 results in throughflow cross sections 25 which are different for the individual turns 10. The line arrangement 2 can be used as an inductor for the production of joints, e.g. constant-velocity ball joints. The inductor is e.g. inserted in joint outer parts 30 of constant-velocity joints such that at least the inner surfaces of the joint outer part 30 (e.g. guide surfaces for balls or for a cage) can be treated by the inductor.

The line arrangement 2 can be connected to a coolant supply via connection channels 29. The connection channels 29 are connected to the ends 4, 5, e.g. via a soldered connection.

Figure 12:
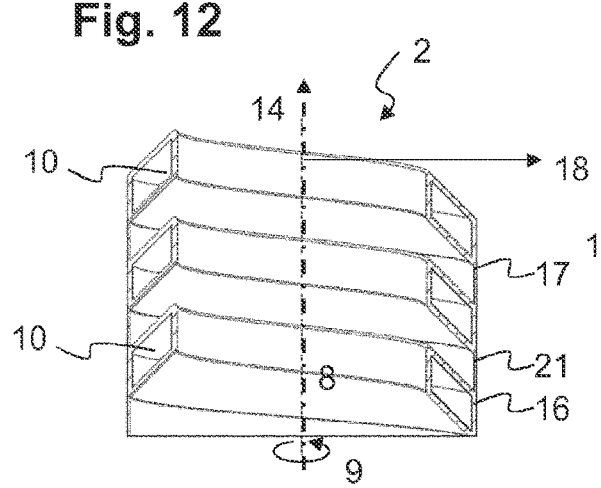
FIG. 12: shows a part of a fourth example of a blank in a perspective view, partially in section.
Figure 13:
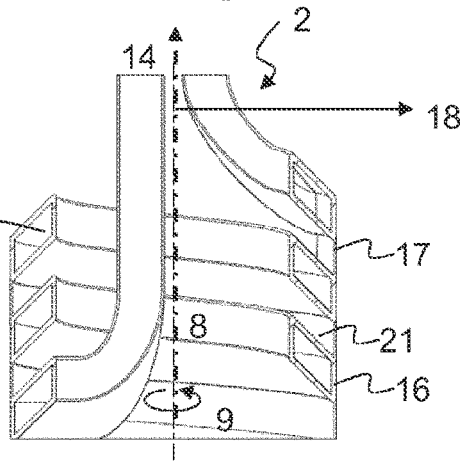
FIG. 13: shows another part of the fourth example according to FIG. 12 in a perspective view, partially in section.
Figure 14:
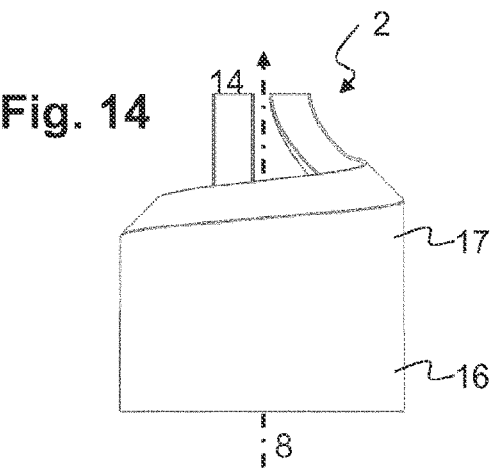
FIG. 14: shows the fourth example according to FIGS. 12 and 13 in a side view.

FIG. 12 shows a part of a fourth example of a blank 1 in a perspective view, partially in section. FIG. 13 shows another part of the fourth example according to FIG. 12 in a perspective view, partially in section. FIG. 14 shows the fourth example according to FIGS. 12 and 13 in a side view. FIGS. 12 to 14 are described jointly below. Reference is made to the statements relating to FIGS. 3 to 6.

The blank 1 has a supporting structure 16 which is used to produce the blank 1. The supporting structure 16 is formed exclusively by second areas 17. Starting from the wall 6, the supporting structure 16 extends in a radial direction 18 exclusively outside the turns 10.

The blank 1 comprises the annular line 3 and the supporting structure 16. By contrast to FIGS. 4 to 6, here the supporting structure 16 is formed exclusively by the connecting wall 21. The supporting structure 16 has a connecting wall 21 which encircles the wall 6 in the circumferential direction 9 and connects the walls 6 of turns 10 which are adjacent to one another to one another. The connecting walls 21 extend here exclusively in the axial direction 14 and in the circumferential direction 9.

Figure 15:
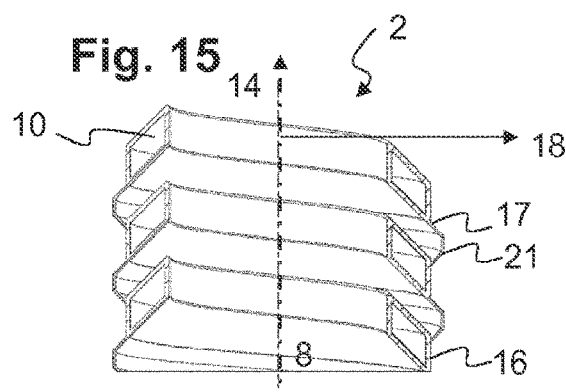
FIG. 15: shows a part of a fifth example of a blank in a perspective view, partially in section.
Figure 16:
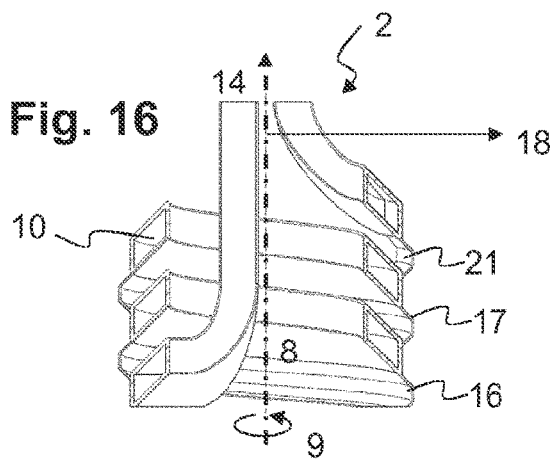
FIG. 16: shows another part of the fifth example according to FIG. 15 in a perspective view, partially in section.
Figure 17:
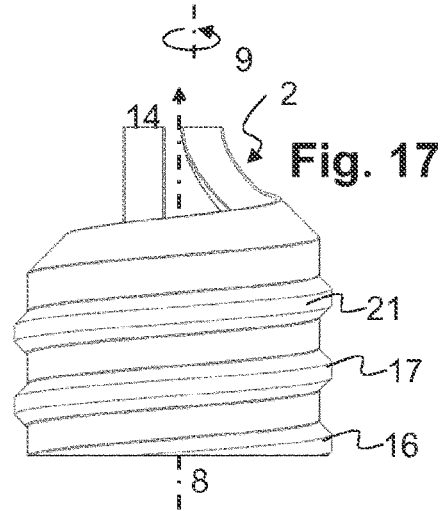
FIG. 17: shows the fifth example according to FIGS. 15 and 16 in a side view.

FIG. 15 shows a part of a fifth example of a blank 1 in a perspective view, partially in section. FIG. 16 shows another part of the fifth example according to FIG. 15 in a perspective view, partially in section. FIG. 17 shows the fifth example according to FIGS. 15 and 16 in a side view. FIGS. 15 to 17 are described jointly below. Reference is made to the statements relating to FIGS. 12 to 14.

By contrast to the fourth example of the blank 1, starting from the wall 6 of a turn 10, the connecting wall 21 extends in the radial direction 18 and in the axial direction 14 (and in the circumferential direction 9).

FIG. 18 shows a part of a sixth example of a blank 1 in a perspective view, partially in section. FIG. 19 shows another part of the sixth example according to FIG. 19 in a perspective view, partially in section. FIG. 20 shows the sixth example according to FIGS. 18 and 19 in a side view. FIGS. 18 to 20 are described jointly below. Reference is made to the statements relating to FIGS. 12 to 14.

By contrast to the fourth example, starting from the wall 6, the supporting structure 16 extends in a radial direction 18 exclusively inside the turns 10.

FIG. 21 shows a part of a seventh example of a blank 1 in a perspective view, partially in section. FIG. 22 shows another part of the seventh example according to FIG. 21 in a perspective view, partially in section. FIG. 23 shows the seventh example according to FIGS. 21 and 22 in a side view. FIGS. 21 to 23 are described jointly below. Reference is made to the statements relating to FIGS. 15 to 17.

By contrast to the fifth example, starting from the wall 6, the supporting structure 16 extends in a radial direction 18 exclusively inside the turns 10.

FIG. 24 shows an eighth example of a blank 1 and/or of a line arrangement 2 in a perspective view. FIG. 25 shows a part of the eighth example of the blank 1 in a perspective view, partially in section. FIG. 26 shows a detail of the blank 1 and/or of the line arrangement 2 according to FIGS. 24 and 25 in a perspective view and partially in section. FIGS. 24 to 26 are described jointly below. Reference is made to the statements relating to FIGS. 1 to 3.

During production of the blank 1, starting from the base area 11, first areas 12 are formed which run in a manner inclined at least by 30 angular degrees with respect to the base area 11 in the axial direction 14 or in which a surface normal 31 forms at least a second angle 32 of from 0 to 60 angular degrees with respect to the base area 11. An area of the blank 1 that makes contact with the (solid) base area 11 and/or a bottom layer can in particular run at a smaller first angle 13.

The channel 7 has a throughflow cross section 25 and the turn 10 forming the channel 7 has a cross section 33 that encompasses the throughflow cross section 25. The cross section 33 has a height 36 between a lower boundary 34 (the lowest point of the cross section 33 in the axial direction 14) and an upper boundary 35 (the highest point of the cross section 33 in the axial direction 14) in the axial direction 14. Starting from the lower boundary 34 and up to approx. 80% of the height 36, the wall 6 has exclusively first areas 12 (which do not make contact with the base area 11). In the rest of the region of the cross section 33 (i.e. from approx. 80% of the height 36 to 100% of the height 36), the wall 6 of the turn 10 is formed by areas (i.e. in particular surfaces, here a curved surface with a radius in the throughflow cross section 25 of at most 8 millimeters) which run in a manner inclined by less than 30 angular degrees with respect to the base area 11 and the surface normal 31 of which forms at least a (smallest) second angle 32 of more than 60 angular degrees with respect to the base area 11.

The invention claimed is:

1. A blank of a line arrangement, comprising:
   an annular line which has a first end and a second end and is formed by a channel enclosed by a wall; and
   a supporting structure that is formed by second areas having a weight of at least 30% by weight with respect to material forming the supporting structure;
   wherein the line arrangement has an axis of rotation and the annular line extends in a circumferential direction over more than 360 degrees around the axis of rotation and forms at least two turns;
   wherein the turns are arranged adjacent to one another in an axial direction, and wherein the axis of rotation is arranged perpendicular to a base area;
   wherein the channel has a throughflow cross section and at least one of the turns forms the channel and has a cross section that encompasses the throughflow cross section, and the cross section has a height between a lower boundary and an upper boundary in the axial direction;

wherein, starting from the lower boundary and up to at least 30% of the height, the wall exclusively includes first areas (a) that are arranged at a first angle of at least 30 degrees with respect to the base area, or (b) in which a surface normal forms at least a second angle of from 0 to 60 degrees with respect to the base area;

wherein first sub-areas of the walls of adjacently arranged turns face one another in the axial direction and are arranged spaced apart from one another;

wherein the blank is produced by an additive manufacturing process;

wherein the line arrangement is used as an electrical inductor through which a coolant can flow via the channel; and wherein the second areas are arranged (a) at an angle of at least 30 degrees with respect to the base area, or (b) such that a surface normal forms at least a second angle of from 0 to 60 degrees with respect to the base area.

2. The blank of claim 1, wherein, starting from the wall, the supporting structure extends in a radial direction one of inside or outside the at least one turn.

3. The blank of claim 1, wherein the supporting structure has a weight of at most 30% by weight with respect to material forming the blank.

4. The blank of claim 1, wherein the supporting structure comprises a web that extends inwardly or outwardly from the wall of the at least one turn at least in a radial direction and encircles the wall in the circumferential direction; wherein webs of individual turns are attached to a supporting wall which is arranged inside or outside the at least one turn and extends from the base area in the axial direction.

5. The blank of claim 1, wherein the supporting structure comprises a connecting wall which encircles the wall in the circumferential direction and connects the walls of turns which are arranged adjacent to one another to one another.

6. The blank of claim 1, wherein, in the axial direction, the blank has a first end face and an oppositely arranged second end face; wherein the first end and the second end are arranged on the second end face; wherein, starting from the first end, the channel extends at least partially in the axial direction as far as the first end face and forms a first turn at the first end face.

7. The blank of claim 1, wherein the throughflow cross section has a largest width, wherein the largest width is at least eight millimeters.

8. The blank of claim 1, wherein the two turns respectively have cross sections which are arranged adjacent to one another in the axial direction, wherein the two cross sections are different from one another.

9. The blank of claim 1, wherein first sub-areas of adjacently arranged turns that face one another in an axial direction are arranged spaced apart from one another, and individual turns are connected exclusively via the wall.

* * * * *